Dec. 8, 1942.  A. B. DORAN  2,304,154
CATALYTIC CONVERSION OF HYDROCARBONS
Filed Nov. 24, 1939
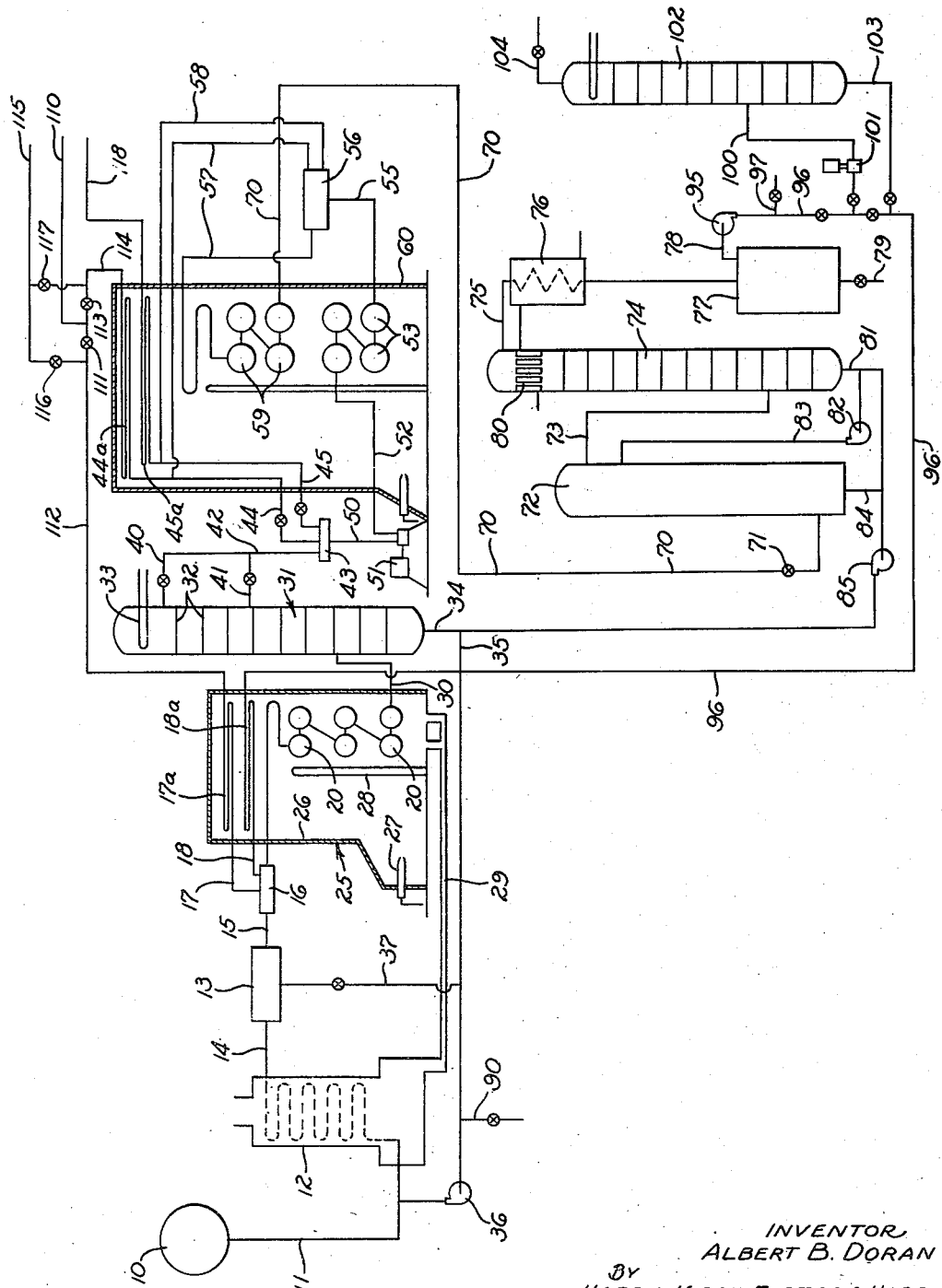
INVENTOR
ALBERT B. DORAN
BY
HARRIS, KIECH, FOSTER & HARRIS
Ward D. Foster
FOR THE FIRM
ATTORNEYS Patented Dec. 8, 1942

2,304,154

UNITED STATES PATENT OFFICE 2,304,154

CATALYTIC CONVERSION OF HYDROCARBONS

Albert B. Doran, Los Angeles, Calif., assignor to Dorex, Inc., Reno, Nev., a corporation of Nevada Application November 24, 1939, Serial No. 305,901

7 Claims. (Cl. 196—52)

This invention relates to the conversion of hydrocarbons, and more particularly to a method and catalyst for the conversion and reforming of hydrocarbons.

Hydrocarbon conversion processes have wide industrial application for the purpose of converting high-boiling hydrocarbons into lower boiling hydrocarbons or for structurally reforming hydrocarbons into material having improved utility or both. In reducing the boiling point of hydrocarbons, it is essential that there be a cleavage of a carbon-carbon bond, but in reforming various reactions may occur including dehydrogenation, isomerization, alkylation, polymerization, cyclization, aromatization, and the like.

It is an object of the present invention to provide a catalytic process for the conversion of hydrocarbons, including reforming thereof, and in particular to provide such a process adapted to produce large yields of highly alkylated or cyclized products having superior anti-knock properties when used as a motor fuel and also having superior solvent properties.

I have discovered that the desired conversion reaction may be induced and/or guided by a catalyst comprising a heavy metal salt of an acidic oxide of manganese, more particularly heavy metal manganites and permanganites.

It is an object of the present invention to provide catalysts of the type described and to provide a method for their efficient utilization in the catalysis of hydrocarbon conversions.

It is a further object of the present invention to provide a catalytic conversion process of the kind described in which variable proportions of auxiliary gases, such as air, steam, carbon dioxide, or their equivalents, as hereinafter described, are employed to condition the catalyst and/or maintain it at a high level of activity and/or to react with the hydrocarbon particularly for the purpose of forming oxygenated intermediates adapted to yield ultimately the desired reformed hydrocarbons, and/or to suppress undesired reaction and to prevent the formation of undesired deposits.

Further objects and aspects of my invention will become apparent in the following description of my process, particularly as made with reference to the drawing, which is a schematic representation of equipment suitable for carrying out my process.

Referring to the drawing, 10 is a storage vessel containing the hydrocarbon stock which it is desired to convert. This stock is transferred by means of a transfer pipe 11 to a pipe still 12 where it is heated to a temperature sufficient to induce substantial vaporization, which vaporization may take place either in the pipe still or an expander or flash chamber 13 into which the heated effluent from the pipe still 12 is conducted by means of a transfer pipe 14. The vaporized hydrocarbons in expander 13 are conducted by means of a transfer pipe 14 to a mixer 16 where the vapors may be admixed with suitable proportions of auxiliary gases, suitably air supplied through a pipe 17 and containing a small proportion of carbon dioxide, if desired, and recycled gases containing gaseous olefins suitably supplied through a transfer pipe 18. These additional materials are preferably heated prior to their admixture with the hydrocarbon vapors as by flow through preheaters 17a and 18a, respectively, as indicated.

The admixed vapors are then passed through a series of externally heated catalyst chambers 20 filled with contact material comprising the manganite or permanganite catalysts as herein described. The catalytic material is preferably employed in the form of discrete particles which leaves substantial pore space for the flow of gases therethrough and if desired the catalyst may be carried by an inert supporting material such as alumina which may be formed in such size and shape as to insure the efficient contact of the catalytic material with the gases while permitting the ready flow of gases through the catalytic bed.

The catalytic vessels 20 as well as the preheaters 17a and 18a may be very conveniently heated by positioning them as indicated in a furnace 25 constructed of heat-resistant walls 26 and having a burner 27 and a baffle 28.

The hot furnace gases are passed downwardly over successive converters 20 so that the flow of the combustion gases is concurrent with the flow of vapors through these catalytic vessels whereby the maximum heat is imparted initially to the coolest portion of the vapor stream.

The flue gases from the furnace 25 may be very advantageously withdrawn through a duct 29 and employed to heat the pipe still 12 as indicated. The effluent from the catalytic converter 20 is conducted by means of a transfer pipe 30 to a bubble tower 31 having bubble trays 32 and a knock-back coil 33. The heavier constituents are liquefied and fractionated out. If desired the heavier high-boiling fractions withdrawn through pipe 34, which will normally consist in part at least of heavy unconverted hydrocarbons, may be transferred by means of a pipe 35 and a pump 36 back into transfer pipe 11 for recycling through the process. This recycle stock may advantageously include any liquid residues left in expander 13 which may be transferred by means of a pipe 37 to the recycle pipe 35.

The overhead from the bubble tower 31 is withdrawn by means of a pipe 40 and this stream may be supplemented if desired by a liquid side-cut withdrawn through a pipe 41, these cuts being commingled in a header 42 leading to a mixer 43. Air, together with a small proportion of carbon dioxide, if desired, may be introduced into mixer 43 by means of a pipe 44 and a pipe 45 serves to introduce superheated steam. Both of these auxiliary gas streams are best provided with preheaters as indicated at 44a and 45a respectively.

The effluent from mixer 43 is brought by means of a transfer pipe 50 to a pump 51 in which the vapors and mixed gases are brought up to a pressure corresponding to that which it is desired to maintain in the succeeding conversion stages. The pressured effluent from pump 51 passes by means of a transfer line 52 into a second converter constituted by catalytic chambers 53. These chambers are filled with catalytic contact material such as described above and are arranged to be externally heated.

The effluent from catalytic chambers 53 is brought by means of a transfer pipe 55 to a third mixer 56 in which it may be mixed with still further quantities of superheated steam, and/or auxiliary gases, such as air or carbon dioxide, suitably by means of pipes 57 and 58 branching from lines 44 and 45.

The effluent from the mixer 56 is conducted by means of a pipe 57 into a third set of externally heated catalytic converters 59 containing as described above a manganite or permanganite catalyst. Catalytic converters 53 and 59, as well as preheaters 44a and 45a, may be advantageously heated in a single furnace 60 similar in general construction to furnace 25. By positioning the converter 59 closer to the zone of combustion than converter 53, the former may be maintained at a relatively higher temperature than the latter.

The effluent from converter 59 is conducted by means of a pipe 70 and an expansion valve 71 into a scrubbing tower 72 whence an overhead fraction is taken by means of a pipe 73 for final fractionation in a fractionating tower 74. The overhead from fractionating tower 74 comprising the finished product together with normally gaseous material is conducted by means of a pipe 75 to a condenser 76. The mixed condensate and gases are withdrawn from the condenser 76 to a gas separator 77 from which the gas is withdrawn by means of a pipe 78 and from which the condensed hydrocarbon fraction may be withdrawn by means of a pipe 79 for storage or further refining.

The fractionating tower 74 may be advantageously provided with a reflux condenser 80 which may be cooled if desired by water circulating from the condenser 76. The heavier fractions which are not desired in the final product and which may be constituted by unconverted and/or polymerized hydrocarbons may be withdrawn as a liquid fraction from the bottom of fractionating tower 75 by means of a pipe 81. A portion of this withdrawn liquid or all may be picked up by means of a pump 82 and transferred through a pipe 83 to the upper portion of the scrubbing tower 72 to serve as a washing liquid therein. The washing liquid and condensate accumulating in the bottom of the scrubbing tower 72 may be withdrawn through a pipe 84 and transferred by means of a pump 85 into the recycle pipe 35. Pump 85 may also take direct suction on the bottoms from the tower 74.

A bleed pipe 90 is provided for recycle pipe 35 by means of which any desired portion of the recycle stock may be diverted from the system.

In addition to the liquid recycle, all or a portion of the gases may be recycled. Thus the gases in pipe 78 may be picked up by means of a pump 95 and conducted by means of a pipe 96 to the preheater 18a. If it is not desired to recycle all of the gases, a portion thereof may be removed from the system by means of a bleed pipe 97. The waste gas may advantageously be subjected to a vapor recovery process.

In many instances it is desirable to recycle only the heavier gases, leaving the lighter fixed gases such as methane to be bled from the system. For this purpose the recycle gases in pipe 96 may be diverted into a pipe 100, pressured by a pump 101, and fractionated in a fractionating column 102. The liquefied gases may be withdrawn from the bottom of the column 102 and returned to the recycle system by means of a pipe 103, while the fixed gases are removed from the top of the column by means of a pipe 104.

The auxiliary gases, including steam, an oxygen containing or oxidizing gas such as oxygen, air, oxides of nitrogen, etc., and if desired a modifying gas such as carbon dioxide, may be conducted to the respective heaters by any suitable piping system. In the system shown air or similar oxidizing gas is supplied under pressure to a main pipe 110. Air is passed from pipe 110 into a pipe 112 at a rate controlled by valve 111, the pipe 112 leading to preheater 17a. A valve 113 controls the rate of admission of air to pipe 114, whence it is led to preheater 44a.

As a rule the inert or modifying gas such as carbon dioxide can be advantageously commingled with the air in the desired proportions prior to heating. Thus carbon dioxide may be supplied under pressure to a pipe 115, and may be admixed in desired proportion with the air in pipes 111 and 114 by means of valves 116 and 117 respectively.

Steam may be generated by any suitable source and conducted to preheater 45a by a pipe 118.

The catalysts which I employ comprise basic oxides of heavy metals in associated or compound form with an acidic oxide or oxides of manganese, more particularly acidic oxides in which the manganese is trivalent or tetravalent, as in manganites and permanganites.

By the term "manganite" I have here particular reference to salts of manganous acid $HMnO_2$ in which the manganese is trivalent. By the term "permanganite" I have reference to salts of permanganous acid $H_2MnO_3$ in which the manganese is tetravalent. For example, I may employ as my catalyst nickel manganite $Ni(MnO_2)_2$. I may also employ polymanganite salts best formulated as a mixed oxide, for example $NiO.(Mn_2O_3)_n$ in which $n$ is a simple integer that can be as high as 10 or more. I may also employ nickel permanganite $NiMnO_3$ or nickel poly-permanganite

$NiO.(MnO_2)_n$ $n$ again being a simple integer.

These compounds may be variously produced, suitably by digestion or contact of the corresponding alkali metal salt with an aqueous solution of a heavy metal desired, as described in my copending applications Serial No. 203,618 and Serial No. 247,830, filed Apr. 22, 1938, and Dec. 27, 1938, respectively.

The alkali manganites or permanganites may be variously produced by methods known to the art, typically by alkaline reduction of a higher valent manganese compound. If desired, the reduction can be accomplished in the presence of a dissolved heavy metal salt whereby the heavy metal manganite or permanganite may be produced directly.

According to the method of preparation, a manganite, permanganite, or mixed manganite and permanganite salt may be obtained. Also there may frequently be more or less uncombined manganese sesquioxide or dioxide in anhydrous or hydrated form. I may employ all of such mixtures as catalysts, although in general the most active catalysts are those which contain a substantial heavy metal content.

The catalyst will normally be obtained in finely divided or precipitated form and for its most efficient utilization it is frequently desirable to employ it in association with a supporting agent, suitably a granular ceramic material which may be coated with the wet catalyst and then dried. Various other methods of catalyst separation may also be employed; for example, precipitation of the catalyst on a supporting agent.

Various heavy metals may be incorporated in my catalyst either singly or in mixture, such as nickel, chromium, zinc, copper, and the like. I find it particularly advantageous to employ as the heavy metal component, those metals which in the reduced state have a recognized catalytic activity for hydrogenation processes, typically nickel.

While I do not wish to be bound by any theory as to the precise relationship between the activity of my catalysts and their molecular structure, apparently at least a portion of their activity is due to the relatively large number of oxygen ions which are in association with a potentially multivalent manganese ion. I believe that this makes it possible for the catalyst to receive or discharge a number of oxygen atoms particularly in the complex poly-manganites and poly-permanganites, whereby these compounds are very effective as a carrier catalyst for oxidative reaction. In addition, the catalytic activity is contributed to or promoted by the presence of the heavy metal ions in the basic portion of my catalyst possibly in some manner connected with their known hydrogenating and dehydrogenating activities. In practice, however, it is observed that the heavy metal compound of my catalyst is in a very stable form not subject to substantial oxidation or reduction.

I have discovered that catalysts of the type described have the very great advantage of being able to cause numerous types of hydrocarbon conversion reactions to take place in one reaction zone, such as dehydrogenation, oxidation, alkylation, isomerization, cyclization, polymerization, and aromatization, these reactions being illustrated in greater detail hereinbelow.

Another very great advantage resident in these catalysts is their ability to be continually reactivated during the process. This continued activity is due in part to the ability of the catalyst to take up oxygen from the mixed stream of oxygen and hydrocarbon vapors, whereby the catalyst is continually maintained in a fully oxygenated and active form and in spite of any temporary reduction that be occasioned by reactions taking place on its surface.

The catalyst also has the ability to keep itself clean and free from masking carbon deposits when employed in an atmosphere comprising oxygen, steam, carbon dioxide, or mixtures of these three gases. I attribute this self cleansing action to the ability of the catalyst to promote the combination of any deposited carbon with oxygen to produce carbon monoxide or carbon dioxide, or to its ability to promote the water-gas type of reaction between the deposited carbon and the steam, or its ability to promote a reaction between carbon and carbon dioxide to produce carbon monoxide, or to promote all of these reactions generally.

The function of the auxiliary gases as employed in my process is not limited to their cleansing effect on the catalyst. Thus the steam may enter directly into various reactions with the hydrocarbons or their oxygenated intermediates, particularly hydrolytic reactions as hereinafter illustrated. The oxygen contained in the air or other oxygen containing gas may enter directly into reaction with the hydrocarbons either as a surface catalyzed reaction, or with the catalyst serving as an oxygen carrier whereby oxidative dehydrogenation of the hydrocarbons may be obtained and various oxygenated intermediates produced, as hereinafter illustrated.

With certain charging stocks it is desirable to mitigate the activity of the steam or air, or both, by admixture with inert gases, particularly carbon dioxide. The use of carbon dioxide is also particularly advantageous with stocks which tend to carbonize badly. With such stocks the degradation to carbon can frequently be suppressed by the addition of a small amount of carbon dioxide, which is also effective in removing previously deposited carbon by reacting therewith in the presence of the catalyst to form carbon monoxide.

The preferred method of working my process is to start with a petroleum hydrocarbon charging stock having a maximum boiling point preferably lower than 750° F. and containing hydrocarbons having preferably not more than 18 carbon atoms in a single chain, such as octadecane or lower members of the paraffin series.

This stock is vaporized and admixed with air, oxygen, or various oxidizing gases such as ozone or nitrogen oxide to the extent of about 5% of the total volume of gases, i. e., 5% of oxygen-containing gases and 95% of gaseous petroleum vapors. If desired, a small proportion of carbon dioxide may also be added.

When this mixture is passed over the catalyst at a temperature from 800° F. to 1500° F., the precise temperature depending upon the nature of the charging stock and the character of the product desired, lower molecular weight olefins are produced. The olefin concentration may still be further increased by recycling of olefinic gases, as indicated in the drawing.

In the first zone the primary reaction is that of dehydrogenation, together with more or less cleavage to lower boiling molecules. Normally catalytic dehydrogenation is reversible in character; that is to say, the olefin formed may be immediately rehydrogenated to form the original paraffin. However, on the surface of the catalyst as herein described dehydrogenation is irreversible since the hydrogen which is split out is immediately oxidized to form water. This may be represented by the equation

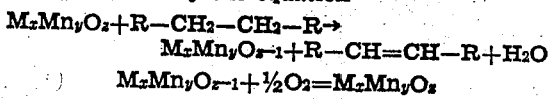

$$M_xMn_yO_z + R-CH_2-CH_2-R \rightarrow$$
$$M_xMn_yO_{z-1} + R-CH=CH-R + H_2O$$
$$M_xMn_yO_{z-1} + \tfrac{1}{2}O_2 = M_xMn_yO_z$$

where $M_xMn_yO_z$ represents symbolically the complex heavy metal manganites and/or permanganites employed as catalysts. This reaction illustrates the irreversible character of the dehydrogenation obtained as well as typifying the role of the catalyst as an oxygen carrier which is continuously regenerated.

Various other reactions may also occur in the first and subsequent zones which are discussed more fully hereinbelow. The effluent from the first zone may comprise some unconverted heavy hydrocarbons as well as some heavy polymers, this heavy material being fractionated out and recycled back through the first unit to obtain further conversion into lower boiling material.

The petroleum hydrocarbons and hydrocarbon gases passing into the second stage of operation may be mixed with superheated water vapor to form a mixture usually comprising from 5% to 15% water vapor and from 85% to 95% hydrocarbon vapor. The amount of superheated steam which is added at this point will depend in part on the amount of water vapor formed in the first reaction zone as given in the illustration above. I may also add additional quantities of oxygen-bearing gases in the second unit for complete conversion of the hydrocarbons to the desired product. These admixed vapors are then subjected to intimate contact with the catalyst in the second zone. The operating temperatures in this zone may be from 800° F. to 1800° F., and the operating pressure in this and subsequent zones may be from atmospheric up to 20 atmospheres or more, depending upon the type of product required and the nature of the charging stock.

I have found it advantageous to have from two to seven reaction zones which may be maintained at different pressures and temperatures. Depending upon the type of charging stock and the nature of the product desired, the conditions in each zone may be varied to optimum for dehydrogenation, oxidation, cleavage, alkylation, cyclization, and the like.

As in purely thermal cracking, cleavage of the high molecular weight paraffins to lower molecular weight paraffins and olefins may take place throughout the entire process. In the presence of the catalyst, however, the time and temperature necessary for these reactions are considerably reduced. Thus I have found that in the presence of my catalyst normal octane decomposes to form short paraffin chains and long olefin chains at relatively low temperatures. With longer chain hydrocarbons the cleavage becomes more complicated, as illustrated by the following reactions $$R-CH_2-CH_2-CH_2-CH_2-CH_2-R$$
$$\downarrow$$
$$R-CH_3+CH_2-CH_2=CH-CH_2-R$$

or

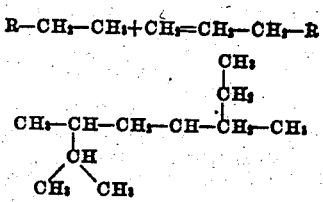

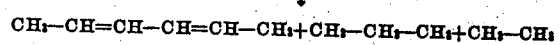

$$CH_3-CH=CH-CH=CH-CH_3+CH_3-CH_3-CH_3+CH_3-CH_3$$

I have also reason to believe that cleavage is further induced by catalytic formation of the olefinic bond as above described with a subsequent weakness of the molecule at this or neighboring positions.

I have found that the double bond is further attacked in the presence of the catalyst by the formation across said bond of an oxide or peroxide structure which may be represented according to the following reactions:

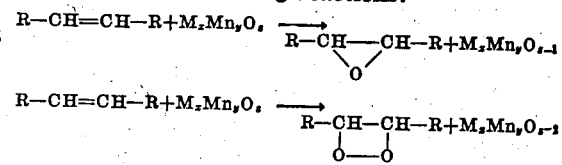

These oxides or peroxides may decompose directly to form a more highly unsaturated molecule, or in the presence of water vapor and the catalyst they may hydrolyze to form polyhydric alcohols or they may be split to form aldehydes. Typical reactions are indicated below:

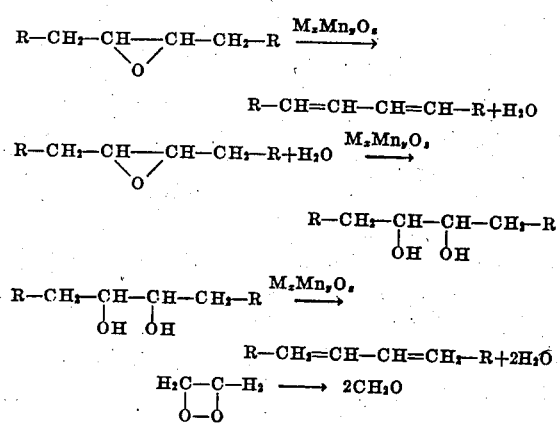

Aldehydes may also be produced by direct oxidation of unsaturates, typically as follows:

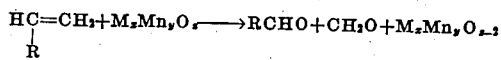

$$M_xMn_yO_{z-2} + O_2 = M_xMn_yO_z$$

Aldehydes constitute one of the most important oxygenated intermediates in the production of alkylated hydrocarbons according to my process. For example, formaldehyde will react instantly with the olefins on the surface of the catalyst prior to possible decomposition with the formation of intermediate cyclic oxygen structures such as given by the general reaction below:

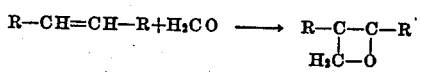

The highly reactive intermediate may be catalytically hydrated in the presence of water vapor to form di-hydric alcohols, as exemplified below:

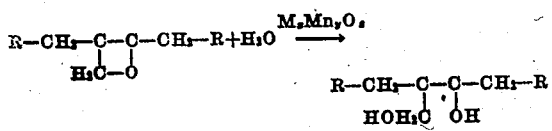

These di-hydric alcohols may then be partially or completely dehydrated to form branch chain unsaturated alcohols and branch chain diolefins respectively.

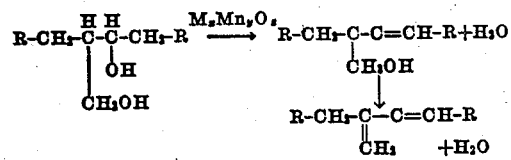

The general sequence normally followed in the building up of highly branched unsaturated hydrocarbons according to the present process is given in the following set of equations:

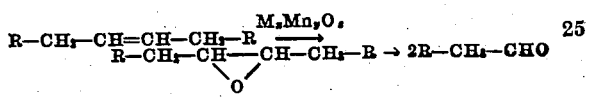

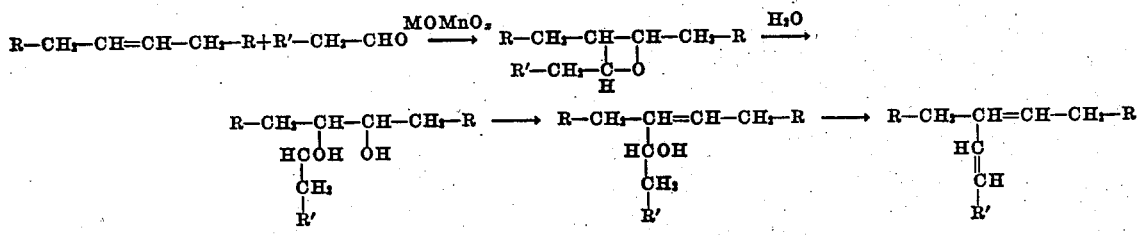

It is possible that in some instances the oxygen ring structure formed by condensation of the formaldehyde with the unsaturates may decompose directly into diolefins without the intermediate hydration and dehydration.

I find that the formation of the aldehydes from olefins and also the condensation of the aldehydes with further olefins is displayed in highest degree by olefins containing 5 to 6 carbons, typically pentenes and hexenes. These reactions are also adequately displayed by lower molecular weight olefins, but with heavier olefins there is an increasing tendency for cleavage and/or polymerization reactions to take place. Polymerization processes are also catalyzed by my process as indicated below.

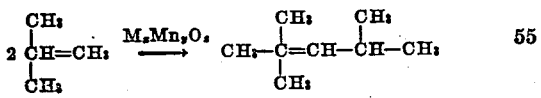

Cyclic and aromatic compounds are produced in my process by ring closure of unsaturates followed in certain instances by dehydrogenation. This type of reaction may take place in the presence of my catalyst within the temperature range of 800° F. to 1800° F. The aromatic compounds which are formed may include benzene, toluene, xylene, naphthalene, and higher homologues, as well as naphthenic compounds such as cyclohexane and homologues thereof. Cyclopentanes may also be produced directly or by isomerization of cyclohexane. Alkylation may take place either prior to, during, or following cyclization, thus forming alkylated naphthenes or aromatics.

The mechanism of the formation of these compounds is, as nearly as I can determine it, illustrated by the following typical reactions which illustrate respectively the condensation of two unsaturates to form a cyclohexene derivative which is further dehydrogenated in the presence of the catalyst to an aromatic, the condensation or ring closure of a single unsaturate to form after subsequent dehydrogenation an aromatic hydrocarbon, and a third mechanism which takes place to some extent, namely, the formation of acetylene by dehydrogenation of ethylene, and polymerization of acetylene to form benzene.

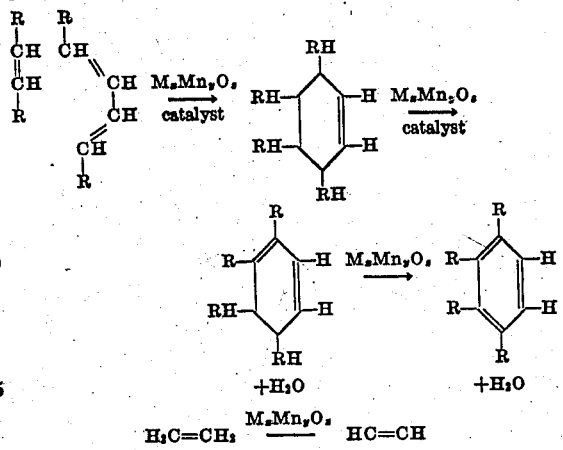

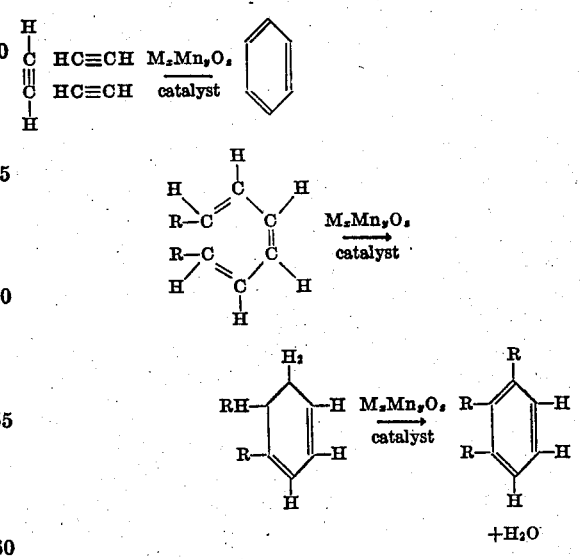

My process is not only adapted to produce highly unsaturated and/or cyclized hydrocarbons, but also the yield is large, the yield of converted liquid being usually over 80%. The loss is represented largely by permanent gases such as methane and hydrogen.

Hydrocarbons converted by my process and falling within the gasoline boiling point range constitute a high compression motor fuel having a very high anti-knock rating. I attribute this high anti-knock rating largely to the decrease in symmetry and increased compactness of the combustible molecule as the result of extensive alkylation, as well as to the presence of a substantial proportion of aromatics and alkylated aromatics.

The extensive alkylation of both the open chain and cyclic compounds as produced by my process leads to compounds having inherently superior combustion characteristics. The position of alkylation is also of importance in chain compounds, since the presence of the alkyl group near the center of the chain endows the molecule with much better anti-knock properties than when the alkyl group is near the end. The centrally alkylated type of hydrocarbon is preferentially obtained in my process inasmuch as the double bond of the saturated hydrocarbons has a tendency to form near the center of the chain, whereby alkylation according to the present procedure attaches the alkyl groups near the center of the molecule. This characteristic is illustrated by the following equations which are drawn to show the type of alkylation, the position of the radicals, and the position of the double bond in the chain.

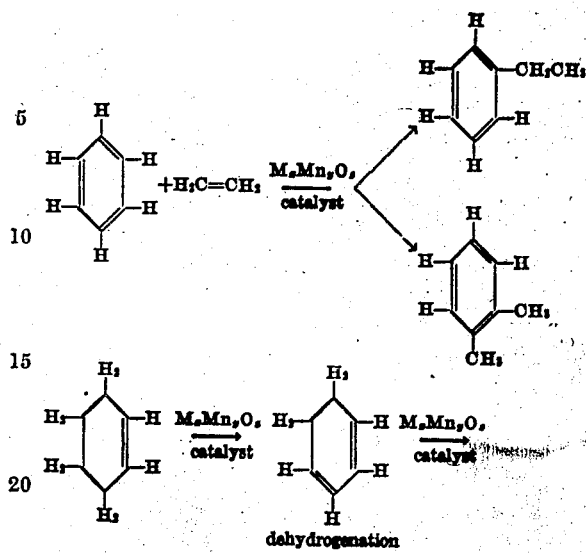

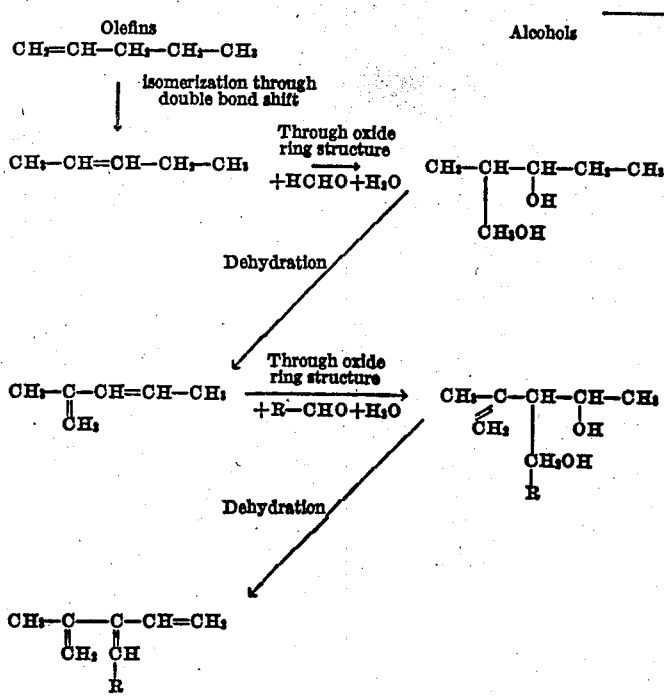

The catalytic conversion of paraffin hydrocarbons in the presence of my catalyst to produce olefins and aromatic and cyclic compounds, as well as short chain paraffins with alkylated branch chains is readily accomplished in the present process. The aromatic and cyclic compounds, as well as tertiary paraffins, may be further alkylated in contact with my catalyst by various reactions, some of which are typified below.

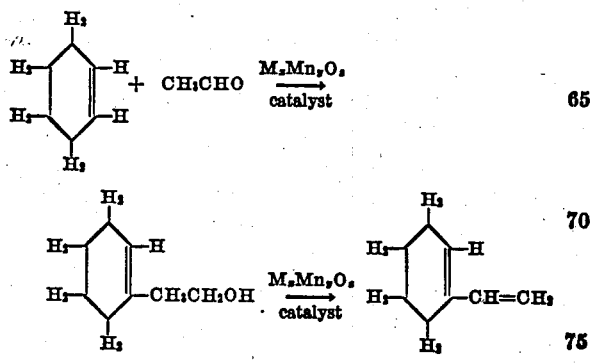

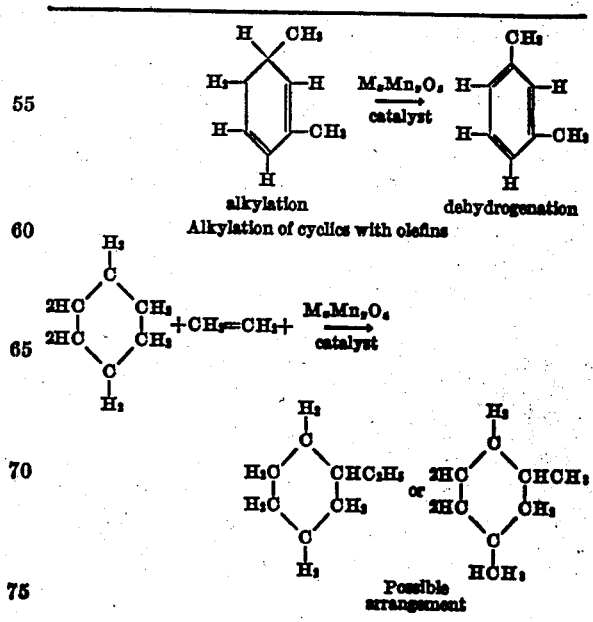

Alkylation of cyclics with alcohols

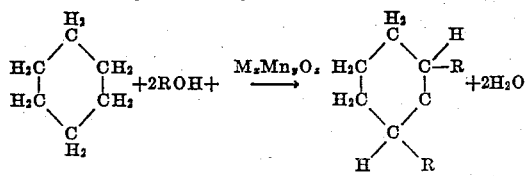

The products of my process, in addition to providing a motor fuel of very superior quality, may also be used as solvents and, if desired, may be fractionated to provide benzene, toluene, and xylene for use in chemical synthesis or as diluents and solvents.

It is understood that the details specified in the description of my process are illustrative rather than limiting and that various modifications can be practiced without departing from the essence of my invention as defined by the scope of the appended claims.

I claim as my invention:

1. A process for converting hydrocarbons into hydrocarbons of superior anti-knock value comprising: contacting said hydrocarbons at elevated temperature with a catalyst selected from the class of heavy metal manganites and permanganites, said contacting with the catalyst being made in the presence of an oxidizing gas.

2. A process for converting hydrocarbons into hydrocarbons of superior anti-knock value comprising: contacting said hydrocarbons at elevated temperature with a catalyst selected from the class of heavy metal manganites and permanganites, said contacting with the catalyst being made in the presence of steam.

3. A process for converting hydrocarbons into hydrocarbons of superior anti-knock value comprising: contacting said hydrocarbons at elevated temperature with a catalyst selected from the class of heavy metal manganites and permanganites, said contacting with the catalyst being made in the presence of carbon dioxide.

4. A process for converting heavy saturated hydrocarbons into lighter unsaturated hydrocarbons comprising: vaporizing said hydrocarbons; admixing said vapors with a minor portion of oxygen containing gas; and passing said mixture over a catalyst selected from the class of heavy metal manganites and permanganites.

5. A process for converting hydrocarbons into hydrocarbons of superior anti-knock value, comprising: vaporizing said hydrocarbons; forming a commingled stream of said vaporized hydrocarbons and a minor proportion of air; passing said stream over a catalyst at a temperature of 800–1500° F. to obtain olefinic vapors; admixing said olefinic vapors with a minor proportion of steam; and conducting said admixture over a catalyst at a temperature of 800–1800° F., said catalyst in both instances being selected from the class of heavy metal manganites and permanganites.

6. A process for converting olefinic hydrocarbons into hydrocarbons of superior anti-knock value comprising: admixing said hydrocarbons in vapor form with a small proportion of steam; and conducting said mixture at elevated temperatures over a catalyst selected from the class consisting of heavy metal manganites and permanganites.

7. A process as in claim 6, in which a minor proportion of air is admixed with the hydrocarbon vapors and steam.

ALBERT B. DORAN.